(12) United States Patent
Drotar et al.

(10) Patent No.: US 11,072,215 B2
(45) Date of Patent: Jul. 27, 2021

(54) MOTOR VEHICLE WHEEL SUSPENSION

(71) Applicant: Ford Global Technologies, LLC, Dearborn, MI (US)

(72) Inventors: Timothy Drotar, Commerce Township, MI (US); Ralf Hintzen, Aachen (DE); Daniel Mainz, Herzogenrath (DE); Paul Zandbergen, Würselen (DE); Friedrich Peter Wolf-Monheim, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 402 days.

(21) Appl. No.: 15/790,264

(22) Filed: Oct. 23, 2017

(65) Prior Publication Data
US 2018/0111432 A1   Apr. 26, 2018

(30) Foreign Application Priority Data
Oct. 24, 2016   (DE) .......................... 102016220786.5

(51) Int. Cl.
*B60G 3/20*   (2006.01)
*B60G 7/00*   (2006.01)

(52) U.S. Cl.
CPC ............... *B60G 3/20* (2013.01); *B60G 7/008* (2013.01); *B60G 2200/18* (2013.01); *B60G 2204/148* (2013.01)

(58) Field of Classification Search
CPC . B60G 3/26; B60G 7/001; B60G 3/20; B60G 2204/129; B60G 2200/144; B60G 2204/1222; B60G 2300/124; B60G 2300/07; B60G 2206/60; B60G 2300/13; B60G 7/008; B60G 2200/18; B60G 2204/148; B60G 7/006; B62D 7/18; B62D 7/20

See application file for complete search history.

(56) References Cited

U.S. PATENT DOCUMENTS

| 2,245,809 | A | * | 6/1941 | Olley | B60G 11/182 267/274 |
| 3,883,152 | A | * | 5/1975 | De Carbon | B60G 9/00 280/124.138 |
| 4,491,341 | A | * | 1/1985 | Maebayashi | B60G 3/225 280/124.128 |

(Continued)

FOREIGN PATENT DOCUMENTS

| EP | 1738939 B1 | 3/2010 |
| WO | WO2007045308 A1 | 4/2007 |

*Primary Examiner* — Paul N Dickson
*Assistant Examiner* — Timothy Wilhelm
(74) *Attorney, Agent, or Firm* — Raymond L. Coppiellie; Burgess Law Office, PLLC

(57) ABSTRACT

A motor vehicle wheel suspension having a wheel carrier connected to the vehicle body or frame. The suspension having a lower transverse link. The wheel carrier connected to the lower transverse carrier at two connection locations. A first connection location on a first side wall of the wheel carrier and second connection location on a second side wall of the wheel carrier. The first connection location including a connector connected to both the lower transverse and the wheel carrier. The second connection location including a connection between the wheel carrier and the lower transverse link.

10 Claims, 6 Drawing Sheets

(56) References Cited

U.S. PATENT DOCUMENTS

| | | | | |
|---|---|---|---|---|
| 4,564,213 A * | 1/1986 | Maebayashi | | B60G 3/26 |
| | | | | 280/124.144 |
| 4,614,359 A * | 9/1986 | Lundin | | B60G 3/205 |
| | | | | 267/246 |
| 4,714,270 A * | 12/1987 | Rumpel | | B60G 3/26 |
| | | | | 280/124.144 |
| 4,798,397 A * | 1/1989 | Komiya | | B60G 7/001 |
| | | | | 280/124.152 |
| 4,817,986 A * | 4/1989 | Kanazawa | | B62D 7/1527 |
| | | | | 280/781 |
| 4,828,279 A * | 5/1989 | Matschinsky | | B60G 3/20 |
| | | | | 280/124.143 |
| 4,848,788 A * | 7/1989 | Rumpel | | B60G 3/202 |
| | | | | 280/124.138 |
| 5,000,476 A * | 3/1991 | Lindorfer | | B60G 3/26 |
| | | | | 280/124.107 |
| 5,022,673 A * | 6/1991 | Sekino | | B60G 3/20 |
| | | | | 280/124.138 |
| 5,048,858 A * | 9/1991 | Luger | | B60G 3/20 |
| | | | | 280/124.136 |
| 5,064,216 A * | 11/1991 | Hynds | | B60G 11/20 |
| | | | | 280/124.152 |
| 5,205,580 A * | 4/1993 | Luger | | B60G 3/20 |
| | | | | 280/124.153 |
| 5,284,353 A * | 2/1994 | Shinji | | B60G 3/20 |
| | | | | 280/124.136 |
| 5,380,024 A * | 1/1995 | Hayami | | B60G 3/20 |
| | | | | 280/124.138 |
| 6,099,005 A * | 8/2000 | Wakatsuki | | B60G 3/20 |
| | | | | 280/124.135 |
| 6,588,779 B2 * | 7/2003 | Sandahi | | B60G 3/20 |
| | | | | 280/124.135 |
| 6,719,314 B1 * | 4/2004 | Schote | | B60G 3/20 |
| | | | | 280/124.135 |
| 6,755,429 B1 * | 6/2004 | Buchwitz | | B60G 3/18 |
| | | | | 280/124.109 |
| 6,942,050 B1 * | 9/2005 | Honkala | | B62M 27/02 |
| | | | | 180/182 |
| 7,325,820 B2 * | 2/2008 | Allen | | B60G 3/18 |
| | | | | 280/124.109 |
| 7,354,052 B2 * | 4/2008 | Orimoto | | B60G 7/008 |
| | | | | 280/124.135 |
| 7,398,982 B2 * | 7/2008 | Hozumi | | B60G 3/20 |
| | | | | 280/93.512 |
| 7,661,689 B2 * | 2/2010 | Kinugasa | | B60G 15/062 |
| | | | | 280/124.135 |
| 7,784,806 B2 * | 8/2010 | Schmidt | | B60G 3/20 |
| | | | | 280/124.134 |
| 7,819,428 B2 * | 10/2010 | Tsuruta | | B60D 1/488 |
| | | | | 280/781 |
| 7,871,084 B2 * | 1/2011 | Hakui | | F16D 3/06 |
| | | | | 280/5.521 |
| 7,896,372 B2 * | 3/2011 | Yanagida | | B60G 3/20 |
| | | | | 280/124.135 |
| 7,950,483 B2 * | 5/2011 | Murata | | B62D 7/18 |
| | | | | 180/65.51 |
| 8,052,160 B2 * | 11/2011 | Hirai | | B60G 3/20 |
| | | | | 280/124.135 |
| 8,061,726 B2 * | 11/2011 | Kunert | | B60G 3/20 |
| | | | | 280/124.15 |
| 8,087,682 B2 * | 1/2012 | Natsukari | | B60G 7/008 |
| | | | | 280/124.143 |
| 8,205,900 B1 * | 6/2012 | Moravy | | B60G 3/265 |
| | | | | 280/124.138 |
| 8,267,416 B2 * | 9/2012 | Allen | | B60G 3/20 |
| | | | | 280/124.135 |
| 8,286,979 B2 * | 10/2012 | Schote | | B62D 7/146 |
| | | | | 280/124.117 |
| 8,328,212 B1 * | 12/2012 | Dundon | | B60G 3/20 |
| | | | | 280/124.138 |
| 8,342,542 B2 * | 1/2013 | Sagara | | B60G 7/04 |
| | | | | 280/5.524 |
| 8,408,568 B2 * | 4/2013 | Yanagida | | B60G 7/001 |
| | | | | 280/124.128 |
| 8,454,041 B2 * | 6/2013 | Fujii | | B60G 3/20 |
| | | | | 280/124.134 |
| 8,628,101 B2 * | 1/2014 | Koide | | B60G 7/001 |
| | | | | 280/124.108 |
| 8,678,409 B2 * | 3/2014 | Koide | | B60G 7/008 |
| | | | | 280/124.135 |
| 8,690,177 B2 * | 4/2014 | Buchwitz | | G06F 16/245 |
| | | | | 280/124.135 |
| 8,708,359 B2 * | 4/2014 | Murray | | B60G 15/062 |
| | | | | 280/124.148 |
| 8,857,836 B2 * | 10/2014 | Okuyama | | B60G 7/02 |
| | | | | 280/124.109 |
| 8,925,947 B2 * | 1/2015 | Schmitz | | B62D 21/11 |
| | | | | 280/124.166 |
| 9,022,402 B1 * | 5/2015 | Rawlinson | | B60G 11/28 |
| | | | | 280/124.125 |
| 9,162,546 B2 * | 10/2015 | Girelli Consolaro | | B60G 7/006 |
| 9,333,824 B2 * | 5/2016 | Zandbergen | | B62D 17/00 |
| 9,358,851 B2 * | 6/2016 | Zandbergen | | B60G 11/16 |
| 9,409,096 B2 * | 8/2016 | Fie, II | | A63H 17/262 |
| 9,463,677 B2 * | 10/2016 | Czerr | | B60G 7/001 |
| 9,469,173 B2 * | 10/2016 | Murray | | B60G 7/001 |
| 9,469,174 B2 * | 10/2016 | Mohrlock | | B60G 7/02 |
| 9,499,024 B2 * | 11/2016 | Mori | | B60G 17/019 |
| 9,643,464 B2 * | 5/2017 | Zandbergen | | B60G 11/113 |
| 9,682,727 B2 * | 6/2017 | Tanaka | | B60G 3/20 |
| 9,776,466 B2 * | 10/2017 | Battaglia | | B60G 7/02 |
| 9,855,806 B1 * | 1/2018 | Jo | | B60G 7/008 |
| 10,106,006 B2 * | 10/2018 | Andou | | B60G 7/008 |
| 10,118,452 B2 * | 11/2018 | Drotar | | B60G 7/008 |
| 10,377,199 B2 * | 8/2019 | Chung | | B60G 3/20 |
| 10,377,418 B2 * | 8/2019 | Sakuma | | B29C 70/081 |
| 10,562,569 B2 * | 2/2020 | Tanaka | | B62D 21/11 |
| 10,604,186 B2 * | 3/2020 | Tanaka | | B60G 99/002 |
| 10,745,051 B2 * | 8/2020 | Tanaka | | B62D 21/11 |
| 2003/0234504 A1 * | 12/2003 | Frantzen | | B60G 15/07 |
| | | | | 280/93.512 |
| 2007/0284840 A1 * | 12/2007 | Murayama | | B60G 3/20 |
| | | | | 280/124.134 |
| 2011/0291376 A1 * | 12/2011 | Allen | | B60G 3/20 |
| | | | | 280/124.1 |
| 2014/0291951 A1 * | 10/2014 | Zandbergen | | B60G 11/16 |
| | | | | 280/79 |
| 2014/0353937 A1 * | 12/2014 | Girelli Consolaro | | B60G 11/22 |
| | | | | 280/124.128 |
| 2015/0061251 A1 * | 3/2015 | Yamada | | B60G 3/26 |
| | | | | 280/86.757 |
| 2015/0084300 A1 * | 3/2015 | Hopson | | B62D 17/00 |
| | | | | 280/93.512 |
| 2015/0183286 A1 * | 7/2015 | Bruehl | | B62D 3/02 |
| | | | | 280/124.135 |
| 2017/0015173 A1 * | 1/2017 | Battaglia | | B60G 3/18 |
| 2017/0274716 A1 * | 9/2017 | Chung | | B60G 3/20 |
| 2018/0001725 A1 * | 1/2018 | Andou | | B60G 7/001 |
| 2018/0273093 A1 * | 9/2018 | Tanaka | | B62D 21/11 |

* cited by examiner

MOTOR VEHICLE WHEEL SUSPENSION

CROSS-REFERENCE TO RELATED APPLICATIONS

Not Applicable.

BACKGROUND OF THE INVENTION

1. Field of the Invention

A motor vehicle wheel suspension; and more specifically, a wheel suspension including a wheel carrier connected to a vehicle body or frame with a lower transverse link.

2. Description of Related Art

Motor vehicle wheel suspensions produce a movable connection between a vehicle body and the wheels. Wheel suspensions provide reliable driving behavior and a high degree of travel comfort. The wheel suspension includes a wheel carrier used for supporting a wheel, along with different links and articulations. Springs and shock absorbers also form part of the wheel suspension. These components our constructed and connected to each other in different manners to form the wheel suspension.

While integral suspensions for rear axles of motor vehicles having suitable travel dynamics and NVH behavior are known, such rear axle suspensions are often more heavy and expensive than other constructions.

SUMMARY OF THE INVENTION

A wheel suspension including a transverse link and a wheel carrier having first and second side walls. A connector is pivotally connected to the first side wall and the transverse link with the said second sidewall pivotally connected to the transverse link.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
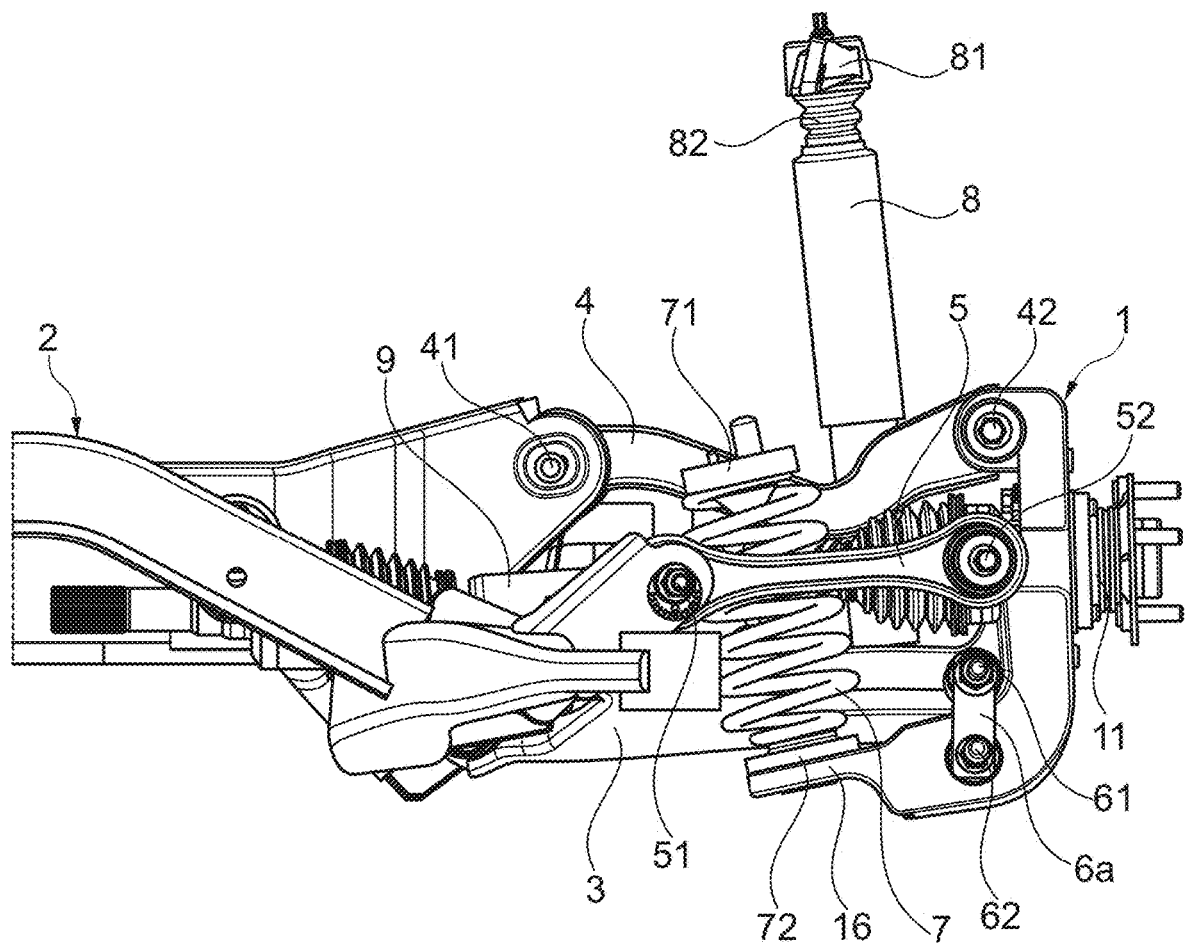
FIG. 1 is a front view of an embodiment of a suspension for a left rear wheel.

The following description of the preferred embodiment(s) is merely exemplary in nature and is in no way intended to limit the invention, its application, or uses.

In the drawings identical components are always given the same reference numerals and are generally only described once.

The drawings illustrate a wheel suspension, in the disclosed embodiment, suspending a left rear wheel of a motor vehicle. While not illustrated in the drawings, the opposite or right rear wheel may be suspended in a similar manner. An arrow, illustrated in FIG. 4, indicates the travel direction X of the motor vehicle. In this instance, the travel direction is in the forward direction.

An auxiliary frame 2, connects the wheel suspension to a motor vehicle body. As illustrated in the drawings a plurality of links 3, 4, 5 connect a wheel carrier 1 to the auxiliary frame 2 of the motor vehicle. Three links including a lower transverse link 3, an upper camber link 4, and a lateral tie rod 5 are provided. The connection between the links 3, 4, 5 and the wheel carrier 1 may, for example, use connection elements such as rubber bearing bushes or ball joints. The corresponding connection elements are typically pressed into the links or the wheel carrier and connected to the other component with fasteners, for example screws and nuts. A hub and wheel bearing unit 11 is securely connected to the wheel carrier 1.

Figure 4:
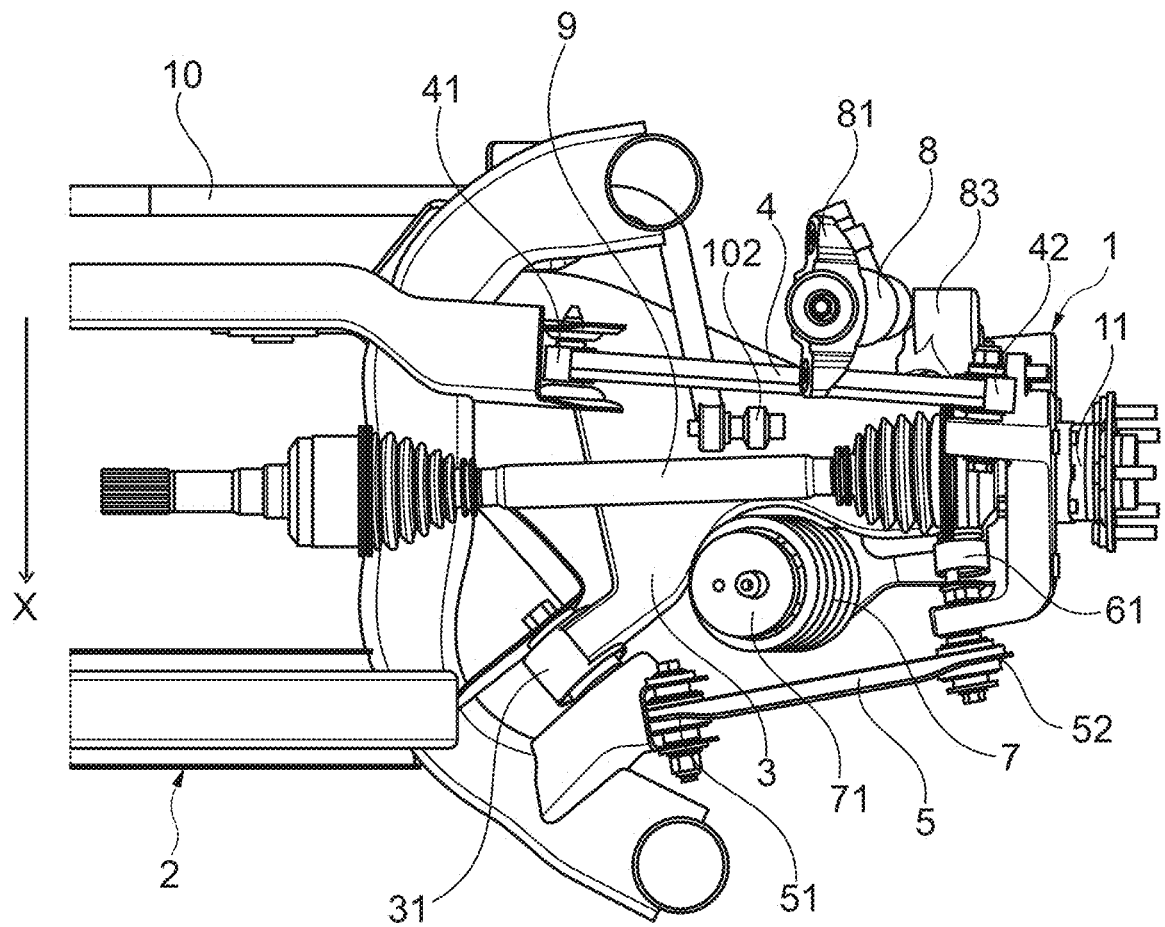
FIG. 4 is a plan view of a suspension according to FIG. 1.
Figure 5:
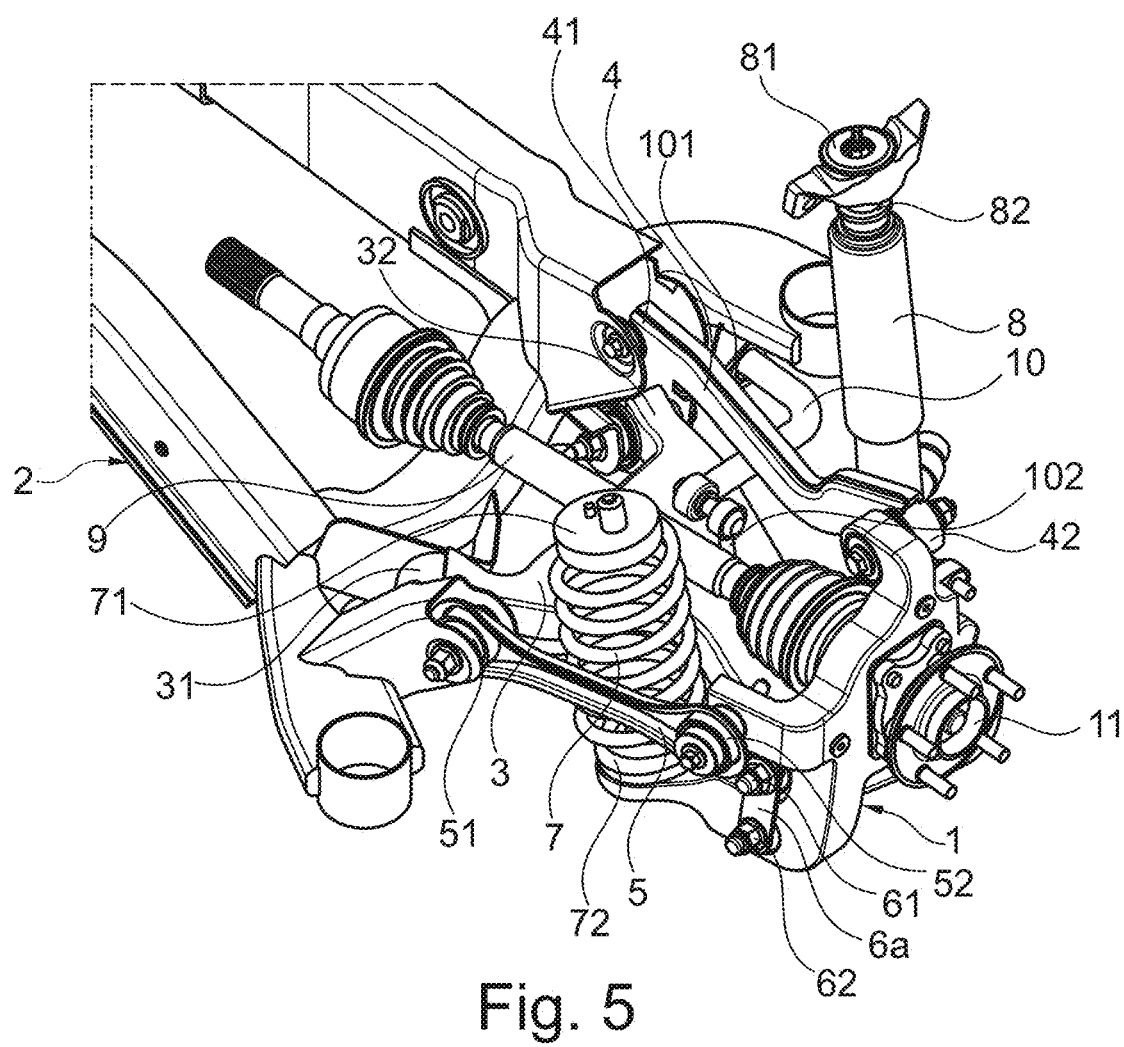
FIG. 5 is an oblique view from above of a suspension according to FIG. 1.
Figure 6:
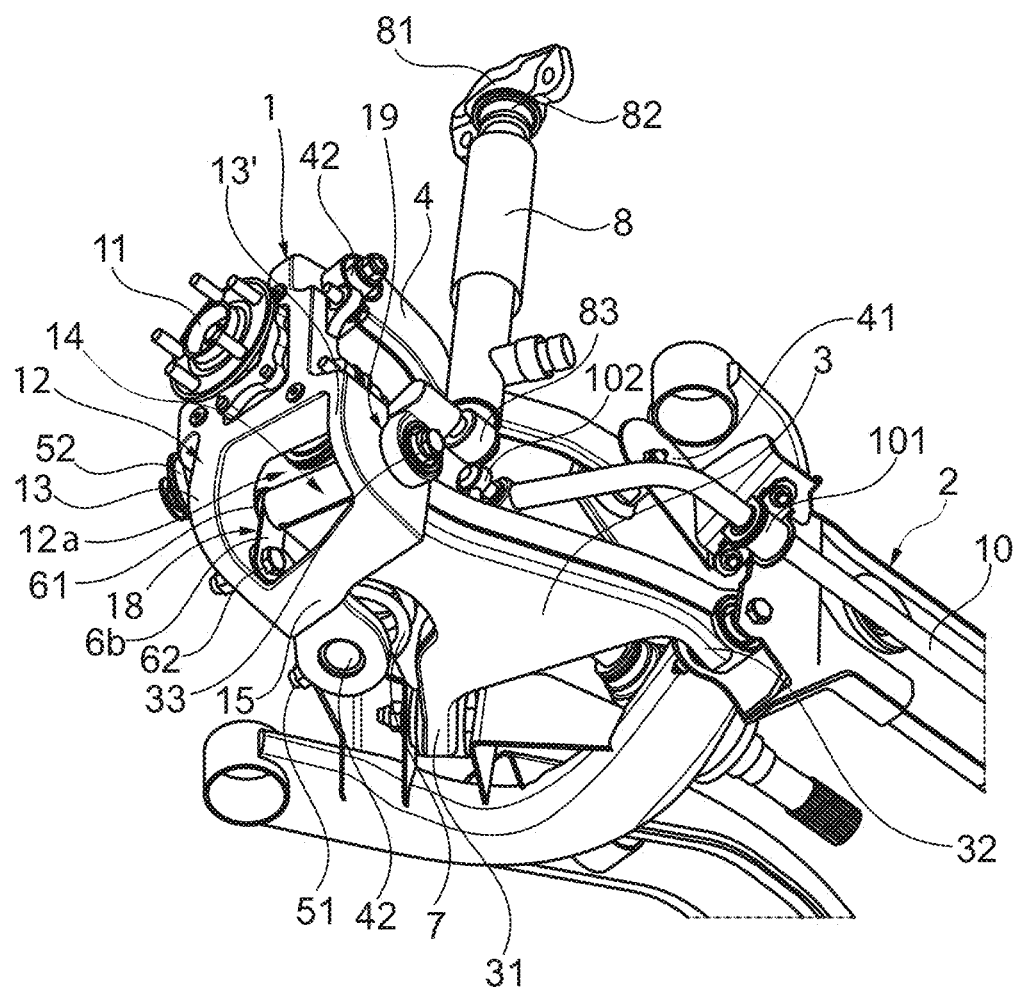
FIG. 6 is an oblique view from below of a suspension according to FIG. 1.

The lower transverse link 3 has a generally trapezoidal configuration having connection portions 31, 32. As shown in FIGS. 4-6, the connection portions 31, 32 are used to connect the lower transverse link 3 to the auxiliary frame 2. The connection elements are typically pressed into the connection portions 31, 32 of the lower transverse link 3. The lower transverse link 3 also connects to the wheel carrier 1 at the narrower or outboard side thereof. As shown, on one side of the wheel carrier 1 two connection elements 6a, 6b are fitted between the lower transverse link 3 and the wheel carrier 1. In one embodiment, the connection elements 6a, 6b are planar elements, for example flat longitudinally extending link members.

Figure 3:
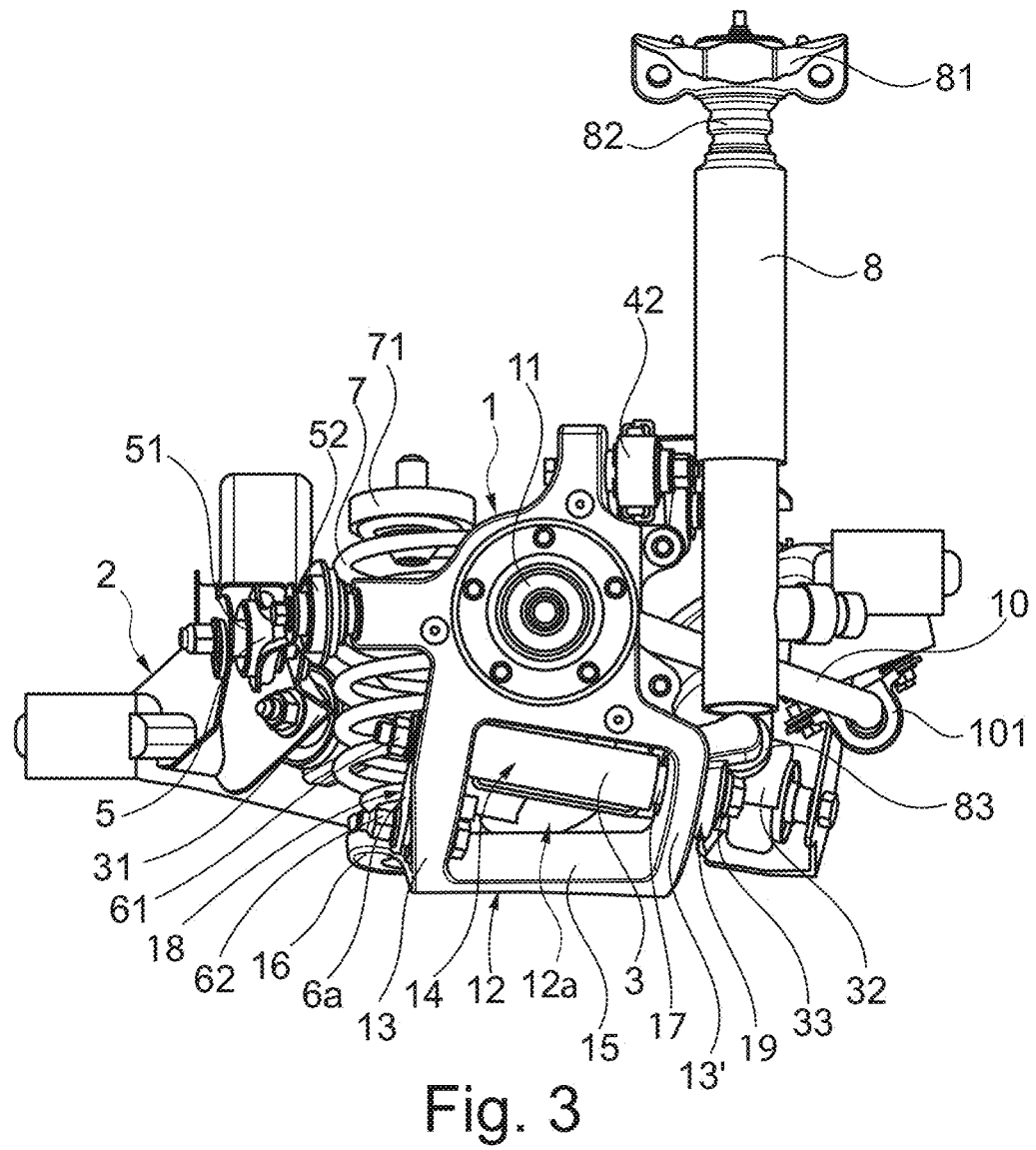
FIG. 3 is a side view of a suspension according to FIG. 1.

FIGS. 3 and 6 show the wheel carrier 1 including a receiving portion 12 having two side walls 13, 13' providing a first connection location 18 and a second connection location 19. The receiving portion 12 having a recess 12a laterally delimited by the two side walls or members 13, 13'. The hub and wheel bearing unit 11 located above the recess 12a. Below the recess 12a a web 15 connects the two side walls 13, 13' whereby the lower transverse link 3 is at least partially received in the recess 12a.

The two planar elements 6a, 6b extend from the first connection location 18 on the wheel carrier 1 to the lower transverse link 3. The ends of the planar elements 6a, 6b positioned on each side of side wall 13 sandwich the outer side wall 13 of the receiving portion 12 between them at the first connection location 18. As shown, first connection location 18 is an articulating joint 62 formed between the ends of the planar elements 6a, 6b and the side wall 13. The articulating joint 62 forming a pivot axis on the wheel carrier wherein the transverse arm 3 is spaced from and pivots about a pivot axis formed at the articulating joint 62. The transverse link 3 includes a tubular region 14. The opposite ends of the planar elements 6a, 6b are located adjacent the tubular region 14 and connect to the lower transverse link 3, forming an articulating joint 61 on one side of the tubular region 14 of the transverse link 3.

The second connection location 19 is between the opposite side of the tubular region 14 of the transverse link 3 and the side wall 13'. As shown, the second connection location 19 is an articulating joint 33 between the side wall 13' of the wheel carrier 1 and the lower transverse link 3. The articulating joints 61 and 33 may include a common pin extending through the tubular region 14 of the lower transverse link 3, the two planar elements 6a, 6b, and the inner side wall 13'. The transverse link 3 rotating about the common pin, which defines a rotation axis. As shown in the pin is spaced from the pivot axis or articulating joint 62.

As seen in FIG. 4, an articulating joint 41 joins the upper camber link 4 with the auxiliary frame 2. An articulating joint 42 joins the upper camber link 4 with the wheel carrier 1. The articulating joints 41, 42 may, for example, include rubber bearing bushes or ball joints pressed into the upper camber link 4 or the wheel carrier 1.

An articulating joint 51 joins the lateral tie rod 5 to the auxiliary frame 2. An articulating joint 52 joins the lateral tie rod 5 to the wheel carrier 1. The articulating joints 51, 52 may, for example, include rubber bearing bushes or ball joints pressed into the lateral tie rod 5 or the wheel carrier 1.

The wheel suspension further includes a spring unit, shown in the disclosed embodiment as a helical spring 7. This helical spring 7 fits between the wheel carrier 1 and the vehicle body or frame. The lower side of the wheel carrier 1 includes a projection 16 formed thereon that receives the spring 7. The projection 16 protrudes inward from the wheel carrier 1. Spring separation elements 71 and spring plates 72 are provided in the end regions of the helical spring 7 to insulate the helical spring 7 with respect to the wheel carrier 1 and the vehicle body or frame. Alternatively, the upper end of the helical spring 7 may be connected to the auxiliary frame 2. In place of helical springs 7, air springs or lateral leaf springs may also be used.

The wheel suspension also includes a damper unit 8 between the wheel carrier 1 and the vehicle body or frame. An articulation element 83, joins damper unit 8, in the disclosed embodiments, to the wheel carrier 1 at the lower end thereof. However, the lower end of the damper unit 8 may also be joined with an articulation joint to one of the links 3, 4, 5. In particular, the lower transverse link 3. Joining or connecting the damper unit 8 to the wheel carrier 1 improves damper transmission. Joining or connecting the damper unit 8 to the lower transverse link 3 has, in contrast, an advantage of a compact construction in a vertical direction, but requires making compromises in damper transmission.

An upper securing member for the damper unit 8 is integrated in a damper retention member 81. This damper retention member 81 is connected to the vehicle body or frame. A stop damper 82 is arranged concentrically around a damper rod and positioned adjacent the damper retention member 81. Optionally, a valve unit may be connected to the damper unit 8 if, for example, using a switchable or continuously adjustable damper system.

Figure 2:
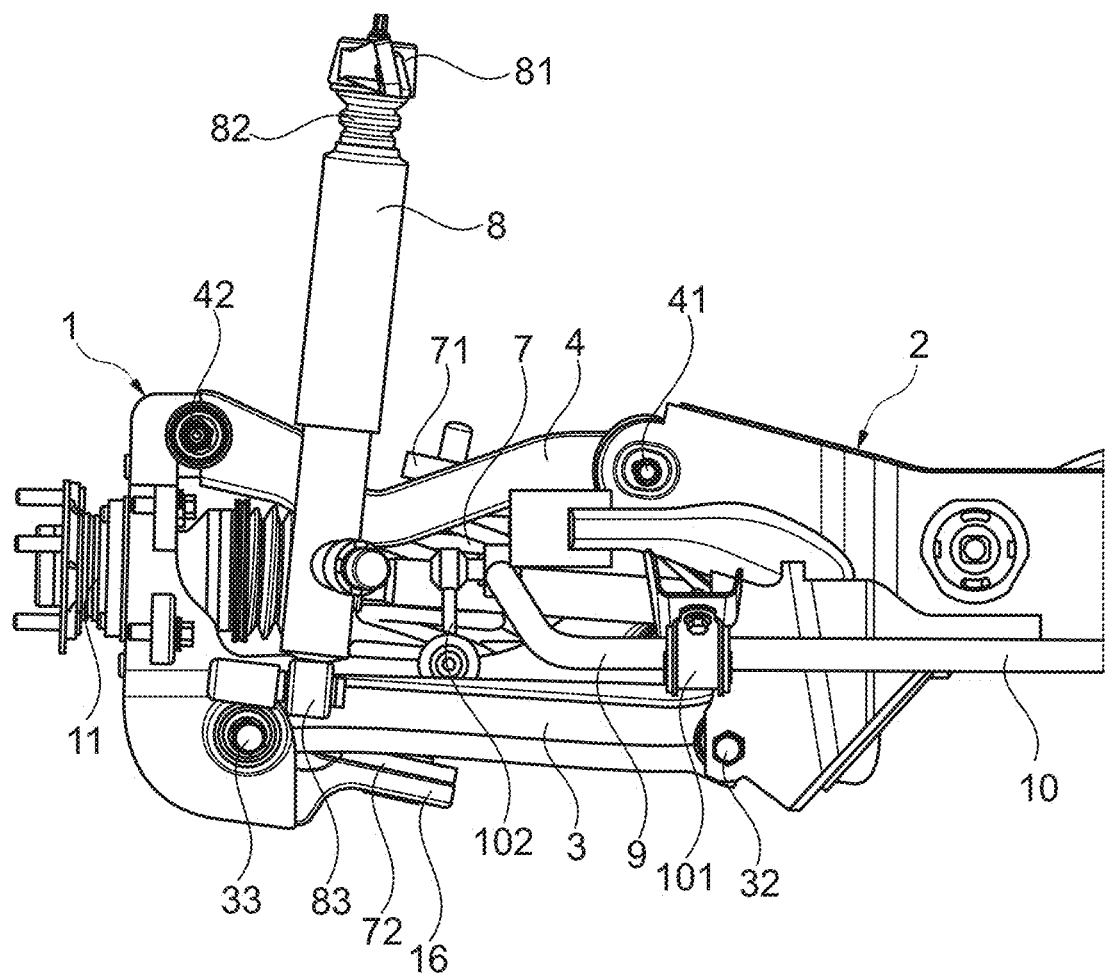
FIG. 2 is a rear view of a suspension according to FIG. 1.

As illustrated in FIG. 4, a drive shaft 9 fits between the hub and wheel bearing unit 11 and a rear drive unit (not illustrated) in conventional manner and drives the rear wheels. A bushing and clamp assembly secures a stabilizer rod 10 to the auxiliary frame 2. FIGS. 2 and 6 show a left bushing and clamp 101, wherein another bushing and clamp is provided at the right-hand side of the motor vehicle, which is not illustrated. FIG. 2 shows a downward strut 102 use for connecting the stabilizer rod 10 to the lower transverse link 3. The opposite wheel suspension 2 for the right rear wheel, also includes a downward strut providing a connection to the opposing lower transverse link. Alternatively, the downward struts 102 may also be connected to a wheel carrier 1 or an upper camber link 4.

All connections of the links 3, 4, 5 to the auxiliary frame 2 may include bushes or ball joints pressed into the links or the auxiliary frame. Further, connections of the links 3, 4, 5 to the wheel carrier 1 may also include bushes or ball joints pressed into either the links or the wheel carrier 1.

As illustrated, in exemplary embodiment of the wheel suspension according to the invention includes a wheel carrier 1 connected to the vehicle body or frame 2 of the motor vehicle with a plurality of links 3, 4, 5. In particular the wheel carrier 1 is connected with at least an upper camber link 4, a lower transverse link 3, and a lateral tie rod 5.

The wheel carrier 1 connects through connection elements 6a, 6b to the lower transverse carrier 3 at a first connection location 18 formed by the connection elements 6a, 6b wherein the ends of the two connection elements 6a, 6b connect to and form an articulated joint 62 between the connection elements 6a, 6b and the wheel carrier 1. While the opposite ends of the connection elements 6a, 6b connect to and form an articulated joint 61 with the lower transverse link 3. As illustrated the connection elements 6a, 6b form part of the first connection location 18 between the lower transverse link 3 with the wheel carrier 1. The second connection 19 location formed by the articulated joint 33 between the wheel carrier 1 and the lower transverse link 3. The foregoing assembly provides a space-saving and easy fitting of the wheel carrier 1 to the lower transverse link 3 can be provided. The lower transverse link 3 may, for example, be connected with two articulated joints 31, 32 to the vehicle body or frame 2 of the motor vehicle.

To arrange the two connection locations appropriately and construct the wheel carrier 1 in a correspondingly advantageous manner, the wheel carrier 1 includes a receiving member 12 with two side walls 13, 13'. The first connection arranged on a first side wall 13, with the second connection location is arranged on a second side wall 13'. The wheel carrier 1 may, for example, be constructed in a fork-like manner with two side walls or members 13, 13'. To increase stability and rigidity, the ends of the two side walls 13, 13' are, preferably connected to each other with a web 15 so that an enclosed recess 12a is formed in the wheel carrier 1.

The first connection location 18 may be formed in different ways, in particular a plurality of connection elements 6a, 6b are used. The two connection elements 6a, 6b receive the first side wall 13 between them. The first connection location is formed by two planar elements 6a, 6b receiving a first side wall 13 between them, wherein the two planar elements 6a, 6b are connected to the lower transverse link 3 with an articulated joint 61, and are connected to the wheel carrier 1 with an articulated joint 33. The connection elements 6a, 6b pivot or rotate with respect to the wheel carrier 1 at articulating joint 62 and the connection elements 6a, 6b pivot or rotate with respect to the transverse link at articulating joint 61.

The lower transverse link 3 may be formed as a two-piece metal housing having two connection locations to the vehicle body and another structure for connection to the wheel carrier 1. The lower transverse link 3 may also be constructed as a cast aluminum component.

The articulated joints 61, 33 may, in the disclosed embodiment, be formed by a common pin 17 extending through a tubular region 14 on the lower transverse link 3. The pin 17 extends between the two planar elements 6a, 6b and the first wall 13. As shown, the pin 17 rotatably connected at one side to the two planar elements 6a, 6b, extends through the tubular region 14 of the lower transverse link 3, and rotatably connects at the opposing side to the second side wall 13' of the wheel carrier at articulated joint 33.

The lower transverse link 3 is generally constructed in a lightweight and cost-saving manner, wherein the connection locations to the vehicle body or frame 2 and wheel carrier 1 can be constructed in a sufficiently stable manner. This may be achieved by the fork-like region on the wheel carrier 1 having two side walls 13, 13' between which the lower transverse link 3 with the tubular region 14 is received. This tubular region 14 of the lower transverse link 3 can be formed by the structure of the transverse link 3. In an embodiment of the invention, the tubular region 14 is formed by a separate tubular structure incorporated in the lower transverse link 3.

The lower transverse link 3 may be constructed in a trapezoidal manner, wherein it is connected at the wider end thereof with two articulations 31, 32 to the vehicle body or frame 2 and at the narrower end thereof by the tubular region 14 the wheel carrier 1. In contrast, known lower transverse links are generally constructed with two individual arms by means of which the lower transverse link is connected to a wheel carrier.

The articulated joint 61 between the connection elements 6a, 6b and the lower transverse link 3 is above the articulated joint 62 between the connection elements 6a, 6b and the wheel carrier 1. The lower transverse link 3 may further protrude partially into the recess 12a of the receiving portion 12 of the wheel carrier 1. The lower transverse link 3 protrudes with the tubular region 14 thereof into the recess 12a in the wheel carrier 1. Furthermore, the articulating joint 61, when viewed from the vehicle center, is located further outward than the articulating joint 62. Further, the first connection location 18, the articulating joints 61, 62 are, as connected at the outer side of the transverse link 3. As shown, the wheel carrier 1 is connected by at least one connection element 6a, 6b and two articulating joints 61, 62 to the lower transverse link, and the wheel carrier 1 is connected directly by an articulating joint 33 to the lower transverse link 3.

The two connection elements 6a, 6b, shown as plate-like link members, receive the first side wall 13 of the receiving portion, 12 of the wheel carrier 1 between them and can be connected to the pin 17 adjacent to one another, wherein the two planar elements 6a, 6b are preferably constructed to angle in opposing directions. In this manner, the two planar elements 6a, 6b may be adjacent or abut one another at articulated joint 61, in the region of the pin 17 and the lower transverse link 3. In the subsequent path, facing away from the pin 17, the two planar elements 6a, 6b angle outward producing a spacing between the two planar elements 6a, 6b that enables the first side wall 13 to be received between the two planar elements 6a, 6b.

For this and alternative construction types, the two connection elements 6a, 6b need not be constructed in a planar manner, but instead other cross-sections may also be used. However, the planar connection elements 6a, 6b provide a space-saving embodiment.

Besides the components described and the arrangement thereof, additional measures can be provided to provide, compared with known systems, as light, space-saving and inexpensive wheel suspension. For example, the wheel suspension may include a damper unit 8, preferably arranged downstream of the wheel center when viewed in the travel direction X. The damper unit 8 arranged between the wheel suspension and the vehicle body or frame 2. The damper unit 8 may fit different components of the wheel suspension. In one embodiment, the damper unit 8 connects to the wheel carrier 1 and achieves a damper transmission of approximately 1. However, it may connect to one of the links, in particular to the lower transverse link 3. Even if the damper unit 8 is connected to the lower transverse link 3, the lower transverse link 3 can still be constructed in a light and cost-saving manner. The damper unit 8 is preferably arranged to be as deep as possible to achieve an efficient vertical suspension system.

The wheel suspension may include at least one spring unit preferably connected to the wheel carrier 1. The spring unit typically includes a helical spring 7. The suspension may include a horizontally extending stabilizer rod 10 connected to a component of the wheel suspension. This stabilizer rod 1, for example, connected to the lower transverse link 3 with a downward strut 102. Such an embodiment may include the upper camber link 4, when viewed in the travel direction X, arranged downstream of the wheel center between the damper unit 8 and this downward strut 102.

The connection elements or articulated joints between the three links, the lower transverse link 3, upper camber link 4, and lateral tie rod 5, and the wheel carrier 1 or vehicle body may include rubber bearing bushes or ball joints. The associated elements may be pressed into the respective component and then connected to another component in each case, for example, with screws and nuts. In this manner, the disclosed embodiment provides a weight-optimized and cost-optimized rear wheel suspension with bearing bushes. The features and measures set out individually in this description can be combined with each other in any technically advantageous manner and set out other embodiments of the invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wheel suspension for a motor vehicle comprising:
   a wheel carrier wherein the wheel carrier connects to a motor vehicle frame using an upper camber link, a lower transverse link and a lateral tie rod comprising:
   the wheel carrier having a first side wall and a second side wall;
   a planar element extending between the first side wall of the wheel carrier and the lower transverse link, the planar element pivotally connected to the lower transverse link at a first joint and pivotally connected to the first side wall at a second joint;
   the second side wall pivotally connected to the lower transverse link at a third joint;
   wherein the first joint and the third joint include a common pin; and
   the lower transverse link has a tubular region through which the common pin extends between the planar element and the second side wall.

2. The wheel suspension of claim 1 wherein the wheel carrier includes a receiving portion formed by a recess in the wheel carrier, wherein said first and second side walls are connected by a web.

3. The wheel suspension of claim 1 wherein in an operative state, the first joint is above the second joint.

4. The wheel suspension of claim 1 including a damper unit located downstream of a wheel center when viewed in a forward travel direction.

5. The wheel suspension of claim 4 wherein the damper unit connects to the wheel carrier.

6. The wheel suspension of claim 1 including at least one spring unit connected to the wheel carrier.

7. A wheel suspension for a motor vehicle comprising:
a wheel carrier wherein the wheel carrier connects to a motor vehicle frame using an upper camber link, a lower transverse link and a lateral tie rod comprising:
the wheel carrier having a first side wall and a second side wall;
a planar element extending between the first side wall of the wheel carrier and the lower transverse link, the planar element pivotally connected to the lower transverse link at a first joint and the planar element pivotally connected to the first side wall of the wheel carrier at a second joint;
the second side wall pivotally connected to the lower transverse link at a third joint;
a damper unit located downstream of a wheel center when viewed in a forward travel direction;
a horizontally extending stabilizer rod connected to the lower transverse link by a downward strut; and
the upper camber link, when viewed in a forward travel direction, is arranged downstream of the wheel center between the damper unit and the downward strut.

8. A wheel suspension comprising:
a transverse link;
a wheel carrier having first and second side walls;
a connector pivotally and directly connected to said first side wall;
a pin pivotally and directly connected on one end to said connector with an opposite end of the pin pivotally and directly connected to said second side wall; and
said transverse link having a tubular region through which said pin extends.

9. The wheel suspension of claim 8 including first and second planar elements, each of the first and second planar elements having first and second ends, the first end of the first and second planar elements pivotally connected to said first side wall and the second ends of the first and second planar elements pivotally connected to said transverse link.

10. The wheel suspension of claim 9 wherein said first and second planar elements are disposed on opposite sides of said first side wall.

* * * * *